United States Patent [19]
Kulawiec et al.

[11] Patent Number: 5,719,676
[45] Date of Patent: Feb. 17, 1998

[54] DIFFRACTION MANAGEMENT FOR GRAZING INCIDENCE INTERFEROMETER

[75] Inventors: Andrew W. Kulawiec, Fairport; Paul F. Michaloski, Rochester, both of N.Y.

[73] Assignee: Tropel Corporation, Fairport, N.Y.

[21] Appl. No.: 631,071

[22] Filed: Apr. 12, 1996

[51] Int. Cl.⁶ ............................................. G01B 9/02
[52] U.S. Cl. ............................. 356/354; 356/359
[58] Field of Search ............................... 356/353, 355, 356/356, 359, 360; 250/237

[56] References Cited

U.S. PATENT DOCUMENTS

| | | |
|---|---|---|
| 3,907,438 | 9/1975 | Holeman . |
| 4,391,526 | 7/1983 | McLaughlin . |
| 4,436,424 | 3/1984 | Bunkenburg . |
| 4,606,640 | 8/1986 | Hirst . |
| 4,653,922 | 3/1987 | Jarisch et al. . |
| 4,678,333 | 7/1987 | Anderson . |
| 4,791,584 | 12/1988 | Greivenkamp, Jr. . |
| 4,898,470 | 2/1990 | Cleaveland . |
| 5,041,726 | 8/1991 | Chang et al. . |
| 5,210,591 | 5/1993 | De Groot . |
| 5,220,403 | 6/1993 | Batchelder et al. . |
| 5,249,032 | 9/1993 | Matsui et al. . |
| 5,268,742 | 12/1993 | Magner . |

FOREIGN PATENT DOCUMENTS

| | | |
|---|---|---|
| 0179935 | 5/1986 | European Pat. Off. . |
| 106769 | 7/1974 | Germany . |
| 215388 | 11/1984 | Germany . |
| 233644 | 3/1986 | Germany . |
| 62-177421 | 4/1987 | Japan . |
| 4221704 | 12/1992 | Japan . |
| 4286904 | 12/1992 | Japan . |

OTHER PUBLICATIONS

"Grazing Incidence Interferometry Applied to the Measurement of Cylindrical Surfaces" by Thomas Dresel et al., Optical Engineering, vol. 34, No. 12, Dec. 1995, pp. 3531–3535.

"Holographically Observed Torsion in a Cylindrical Shaft" by A.D. Wilson, Applied Optics, vol.9 No. 9, Sep. 1970, pp. 2093–2097.

"Oblique Incidence Interferometry Applied to Non–Optical Surfaces" by K.G. Birch, Journal of Physics E. Scientific Instruments, 1973, vol. 6, Great Britain, pp. 1045–1048.

"Measurement of Deformation in a Cylindrical Shell by Holographic Interferometry" by T. Matsumoto, K. Iwata, and R. Nagata; Applied Optics, vol. 13, No.5, May. 1974, pp. 1080–1084.

"Zone Plate Interferometer"by Raymond N. Smart, May. 1974, vol.13, No.5, Applied Optics, pp. 1093–1099.

"Improved Oblique —Incidence Interferometer" by P. Hariharan, Optical Engineering, vol. 14, No. 3, May–Jun. 1975, pp. 257–258.

"Holographic Interferometer to Test Optical Surfaces" by Fernando Broder–Bursztyn and Daniel Malacara–Hernandez, Applied Optics, vol. 14, No. 9, Sep. 1975, pp. 2280–2282.

"Interferometric Surface Mapping with Variable Sensitivity" by W. Jaerisch and G. Makosch, Applied Optics, vol. 17, No. 5, 1 Mar. 1978, pp. 740–743.

"Interferometric Construction of Circular Gratings" by E. Leith, H. Chen, G. Collins, K. Scholten, G. Swanson, and J. Upatnieks, Applied Optics, vol. 19, No. 21,1 Nov. 1980, pp. 3626–3630.

(List continued on next page.)

*Primary Examiner*—Samuel A. Turner
*Attorney, Agent, or Firm*—Eugene Stephens & Associates

[57] ABSTRACT

Test surfaces are measured at grazing incidence with an interferometer using diffractive optics for manipulating reference and test beams. A leading diffractive optic separates the reference and test beams, and a following diffractive optic recombines the beams after the test beam is reflected from the test surface. Extraneous light, including light from other orders of diffraction, is isolated and blocked from combining with test and reference wavefronts.

73 Claims, 6 Drawing Sheets

OTHER PUBLICATIONS

"Optical Figure Characterization for Cylindrical Mirrors and Lenses" by Alvin D. Schnurr and Allen Mann, Optical Engineering, vol. 20, No. 3, May/Jun. 1981, pp. 412–416.

"Cylindrical lenses: Testing and Radius of Curvature Measurement" by R. Diaz–Uribe, J. Pedraza–Contreras, O. Cardona–Nunez, A. Cordero–Davila, and A. Cornejo Rodriquez, Applied Optics, vol. 25, No. 10, 15 May. 1986, pp. 1707–1709.

"Testing Cylindrical Lenses" by Joseph M. Geary, Optical Engineering, vol. 26, No. 12, Dec. 1987, pp. 1219–1224.

"Data Analysis in Fiber Optic Testing of Cylindrical Optics" by Joseph M. Geary, Optical Engineering, Mar. 1989, vol. 28, No. 3 pp. 212–216.

"Interferometry on Wolter X–Ray Optics: A Possible Approach" by Joseph M. Geary, Optical Engineering, vol. 28, No. 3, Mar. 1989, pp. 217–221.

"Constant Radial Shearing Interferometry with Circular Gratings" by Qing–Shin Ru, Nagaaki Ohyama, Toshio Honda, and Jumpei Tsujiuchi, Applied Optics, vol. 28, No. 15, 15 Aug. 1989, pp. 3350–3353.

"Profile Measurement of an Aspheric Cylindrical surface from Retroreflection" Ding–tin Lin and Der–Shen Wan, Applied Optics, vol. 30, No. 22, 1 Aug. 1991, pp. 3200–3204.

"Profile Measurements of Cylindrical Surfaces" by Der–Shen Wan and Ding–tin Lin, Applied, Optics, vol. 32, No. 7, 1 Mar. 1993, pp. 1060–1064.

"Determination of Two–Dimensional Planar Displacement by Moire Fringes of Concentric–Circle Gratings" by Yoon–Chang Park and Seung–Woo Kim, Applied Optics, vol. 33, No. 22, 1 Aug. 1994, pp. 5171–5176.

"Grating Interferometer for Flatness Testing" by Peter J. de Groot, Optics Letters, vol. 21, No.3, Feb. 1, 1996, pp. 228–230.

DIFFRACTION MANAGEMENT FOR GRAZING INCIDENCE INTERFEROMETER

TECHNICAL FIELD

The invention relates to interferometers incorporating diffractive optics for measuring test surfaces at grazing incidence.

BACKGROUND

Diffractive optics provide a convenient way of manipulating wavefronts (beams) for measuring test surfaces at grazing incidence. For example, a leading diffractive optic can be used to divide a primary wavefront into test and reference wavefronts and to reshape the test wavefront to reflect from the test surface at a grazing angle. A following diffractive optic can be used to relatively reshape and recombine the test and reference wavefronts. The resulting interference pattern between the recombined wavefronts is indicative of variations in the test surface.

The test and reference wavefronts are divided and recombined using different diffraction orders of the diffractive optics. Light rays pass directly through diffractive optics at a zero diffraction order but are bent into progressively larger angles at increasingly higher (non-zero) orders of diffraction. For example, the reference wavefront can be diffracted through one or both diffractive optics at a zero diffraction order without change. The corresponding test wavefront can be diffracted by the leading diffractive optic at a non-zero diffraction order into a form for reflecting from the test surface at grazing incidence and can be further diffracted by the following diffractive optic at a similar non-zero diffraction order back into alignment with the reference wavefront. Many other combinations of diffraction orders between the test and reference wavefronts are also possible including diffracting the reflected test wavefront through the following diffractive optic at the zero diffraction order and diffracting the reference wavefront at the non-zero diffraction order into alignment with the test wavefront.

Each diffractive optic requires only two diffraction orders to manage test and reference wavefronts. The remaining diffraction orders disperse portions of the primary wavefront in other directions. Light dispersed by these other diffraction orders can obscure the interference pattern between the test and reference wavefronts by reducing contrast or by producing spurious fringe patterns. Sometimes the light dispersed by other diffraction orders combines with the test and reference wavefronts to change their resulting interference pattern. Instead of representing only variations in the test surface, the altered interference pattern also contains unwanted information about path length variations of other diffraction orders.

This problem is especially troublesome for measuring internal cylindrical surfaces with identical leading and following diffractive optics. Unwanted interference can occur between portions of the light combined by opposite sign (i.e., positive and negative) diffraction orders of the following diffraction grating. After reflecting from the test surface, the test wavefront can be diffracted by the following diffractive optic through one of the signed orders. Other light, propagating in the direction of the test wavefront prior to its reflection, can be diffracted by the following diffractive optic through the opposite sign order. The light diffracted through both the positive and negative orders of the following diffractive optic is bent into alignment with the reference wavefront, thereby disrupting the interference pattern between the test and reference wavefronts with unwanted information.

We have identified a partial solution to this problem from copending U.S. application Ser. No. 08/483,737, filed Jun. 7, 1995, and entitled Interferometric Measurement of Surfaces with Diffractive Optics at Grazing Incidence. Since the test wavefront reflected from the internal surface is on a converging path, the following diffractive optic can be positioned either before or after a region of crossover. If positioned after the region of crossover, any diverging light on a path of an opposite sign order expands well beyond the following diffractive optic.

However, if the following diffractive optic is required to further reshape the test wavefront, then moving the following diffractive optic away from the test surface decreases spatial resolution of any variations in the test surface. Every point on the test surface to some extent scatters the test wavefront so that light reflected from such points illuminates areas on the following diffractive optic. The size of each area increases with increasing distance between the points on the test surface and the following diffractive optic.

Any rays of light approaching the following diffractive optic from outside an axial plane of the test piece are diffracted oblique to the rays approaching from within the axial plane. The oblique rays diffracting at the following diffractive introduce astigmatism, which increases with the size of the areas illuminated on the following diffractive optic. The astigmatism disassociates points on the test surface with their intended points of correspondence in the interference pattern. Thus, the use of crossover to eliminate unwanted light from the interference pattern has the unintended effect of diminishing information about individual points on the test surface.

SUMMARY OF INVENTION

Our invention deals with the problem of light from extraneous diffraction orders disrupting interference patterns between test and reference wavefronts in grazing incidence interferometers. The extraneous light is isolated and blocked from combining with test and reference wavefronts that form the interference patterns.

One arrangement of our new interferometer, which is particularly suitable for measuring internal test surfaces at grazing incidence, includes leading and following diffractive optics that are specially positioned with respect to an internal test surface. The leading diffractive optic divides a primary beam of light into a test beam and a reference beam. A first pathway between the leading and following diffractive optics conveys the test beam at grazing incidence to the internal test surface. A second pathway between the same conveys the reference beam independently of the internal test surface. The following diffractive optic recombines the test and reference beams for producing an interference pattern indicative of variations in the internal test surface.

The following diffractive optic is positioned as usual so that the reflected test beam approaches the following diffractive optic as a converging beam. However, the leading diffractive optic is positioned so that the test beam emanates from the leading diffractive optic as a converging beam before approaching the internal test surface as the required diverging beam. In other words, the leading diffractive optic is sufficiently spaced from the internal test surface to enable the test beam to converge through a focus (i.e., crossover) before approaching the internal test surface at the desired grazing angle. Any light diffracted by the leading diffractive optic at an opposite sign order diverges through the additional distance to the internal test surface. However, extraneous interfering light from the same sign order must still be excluded.

Light emerging from the leading diffractive optic at the same sign order as the test beam can propagate along a third pathway independently of the internal test surface and can be recombined with the test beam at the following diffractive optic through opposite sign orders of diffraction. However, the extraneous light of the same sign order is spatially distinguishable from the test beam, because such extraneous light is diffracted by a different area of the leading diffractive optic than the test beam. An appropriately sized aperture stop located in advance of the internal test surface can be used to block the extraneous light from combining with the test and reference beams at the following diffractive optic.

Another arrangement of our new interferometer also includes leading and following diffractive optics and separate pathways for conveying test and reference beams between them. However, the leading and the following diffractive optics diffract both the test and the reference beams through non-zero diffraction orders, and at least one of the leading and following diffractive optics suppresses transmissions of light at a zero diffraction order.

The modifications required to suppress zero-order diffractions are quite simple. For example, groove depth of diffraction gratings can be controlled to produce destructive interference accompanying the zero-order diffractions. Maximum suppression is obtained by modifying both the leading and the following diffractive optics.

Several new configurations of the leading and following diffractive optics can be used for measuring internal test surfaces. For example, positive and negative diffraction orders of the same magnitude (e.g., positive and negative first orders) can be used to diffract the test and reference beams at the leading diffractive optic. Both orders can emanate from overlapping areas of the leading diffractive optic—the test beam emanating as a diverging beam and the reference beam emanating as a converging beam. The test beam is reflected by the internal surface along a converging path to the following diffractive optic, and the reference beam converges through a focus before approaching the following diffractive optic as a diverging beam. The following diffractive optic diffracts the test and reference beams through opposite sign diffraction orders into alignment with each other as a collimated beam. The zero diffraction order of collimated light in advance of the following diffractive optic is suppressed by modifying at least one of the leading and the following diffractive optics.

The same sign diffraction orders can be used to diffract the test and reference beams from different areas of the leading diffractive optic. Both beams can emanate from the leading diffractive optic as diverging beams. The reference beam continues to diverge upon the following diffractive optic, but reflection from the test internal surface converts the test beam into a converging beam before approaching the same area of the following diffractive optic. Opposite sign diffraction orders of the following diffractive optic combine the test and reference beams into a collimated beam. Zero-order diffractions are suppressed to prevent unwanted light from joining the combined collimated beam.

The leading diffractive optic could also be spaced from the internal test surface similar to the preceding crossover arrangement. The same sign diffraction orders at different areas of the leading diffractive optic are used for diffracting the test and reference beams along converging paths. The test beam, after propagating through a focus, is reflected by the internal test surface along a converging path to the following diffractive optic. The reference beam also converges through a focus before approaching the following diffractive optic along a diverging path. The following diffractive optic diffracts the test and reference beams through opposite sign orders into alignment with each other in a collimated form.

The same area of the leading diffractive optic responsible for diffracting extraneous light in the first crossover arrangement is used for diffracting the reference beam—so aperturing is not wanted to block this light. However, aperturing can still be used to block light diffracted by higher orders of the same sign. Other light from opposite sign orders is scattered along paths that diverge through the additional distance separating the leading diffractive optic from the internal test surface. This leaves collimated light in advance of the following diffractive optic, which is suppressed by the zero-order modification of one of the diffractive optics.

External test surfaces can also be measured with test and reference beams that are diffracted by non-zero orders of diffraction. Different areas of the leading diffractive optic diffract the test and reference beams at the same sign order. The test beam converges to the external test surface and, after reflecting from the external test surface, approaches an area of the following diffractive optic as a diverging beam. The reference beam converges directly to the same area of the following diffractive optic. The test and reference beams are diffracted through opposite sign orders of the following diffractive optic into alignment with each other as collimated light. The suppression of other collimated light by one of the diffractive optics prevents extraneous interference with the recombined test and reference beams.

DRAWINGS

DETAILED DESCRIPTION

Our invention improves upon interferometers incorporating diffractive optics that manipulate optical wavefronts (or beams) for measuring test surfaces at grazing incidence. We define "grazing angles" as non-normal angles inclined from test surfaces within a range of specular reflection. Angles of so-called "grazing incidence" are complementary to these "grazing angles".

Figure 1:
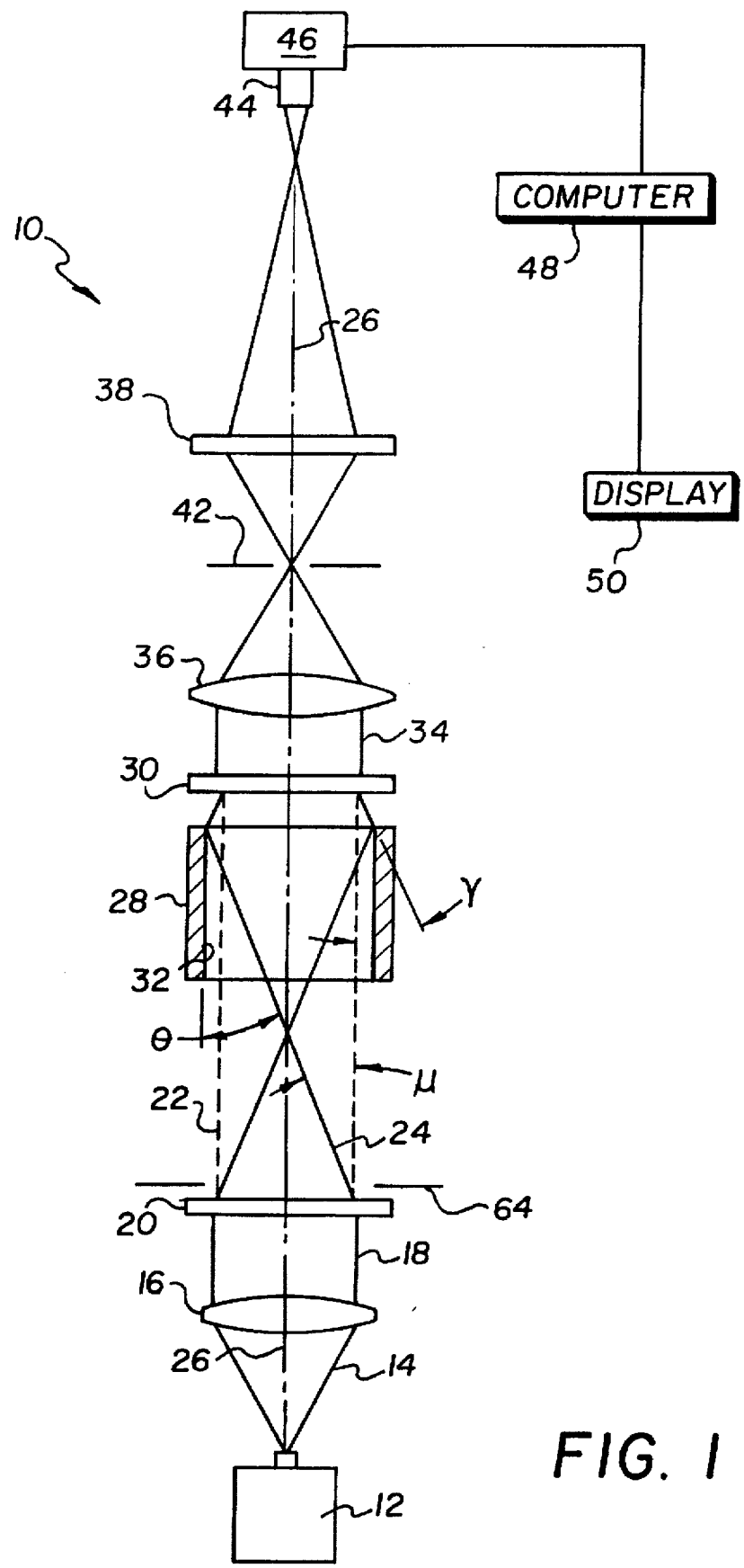
FIG. 1 is a schematic diagram showing the general layout of our new interferometer.

An exemplary interferometer 10 is schematically depicted in FIG. 1 in a Mach-Zender arrangement. A light source 12, such as a laser diode or a HeNe laser, produces a diverging beam 14 of coherent light. A collimator 16 reshapes the diverging beam 14 into a collimated primary beam 18 having a planar wavefront. A leading diffractive optic 20, such as a circular transmissive diffraction grating or binary optic, divides the primary beam 18 into a reference beam 22 and a test beam 24 (see FIG. 2). The reference beam 22 remains collimated as a planar wavefront. However, the test beam 24 is reshaped by the leading diffractive optic 20 into a converging beam having an axiconic wavefront composed of rays that are uniformly inclined to a reference axis 26 through a first diffraction angle "μ", which is measured within axial planes of the reference axis 26.

The reference beam 22 and test beam 24 propagate along respective paths through a hollow center of an exemplary test piece 28 to a following diffractive optic 30. The test beam 24 reflects from different positions on an internal test surface 32 of the test piece 28 at a constant grazing angle "θ". The following diffractive optic 30 further reshapes the reflected test beam 24 back into the collimated form of a planar wavefront through a second diffraction angle "ν".

For measuring nominally straight cylindrical surfaces, the two diffraction angles "μ" and "ν" are equal to each other and to the constant grazing angle "θ". However, the diffraction angles "μ" and "ν" vary from each other for measuring tapered surfaces. Their difference is equal to twice the taper angle, but their sum remains equal to twice the grazing angle "θ".

The reference and test beams 22 and 24 emanate from the following diffractive optic 30 as a collimated combined beam 34 composed of interfering planar wavefronts. An image-forming optic 36 focuses the interfering planar wavefronts of the combined beam 34 as an image of the internal test surface 32 onto a diffuser plate 38. The resulting interference pattern (referred to as an interferogram) represents deviations of the test surface 32 from a theoretical cylindrical surface.

Preferably, the image-forming optic 36 has a high F-number so that the entire length of the internal test surface 32 is approximately equally resolved. An aperture stop 42 excludes light from other diffraction orders that emanate from the following diffractive optic 30 as non-collimated light. A zoom lens 44 relays an image of the interferogram from the diffuser plate 38 to an image-recording device, such as a camera 46. The image is sized, usually by demagnification, to best fill the recording area of the camera 46.

The camera 46, which preferably incorporates a solid state or a charge-coupled device (CCD), records the interference pattern for processing by a computer 48. A display device 50, such as a cathode-ray tube, flat panel device, or printer, displays information about the cylindrical test surface 32 in a useful form. In addition to topographical information, derivable measures such as roundness, straightness, taper, and cylindricity can also be displayed. Alternatively, the information could be electronically stored or transmitted for use in another operation, such as feedback to a manufacturing operation.

Figure 2:
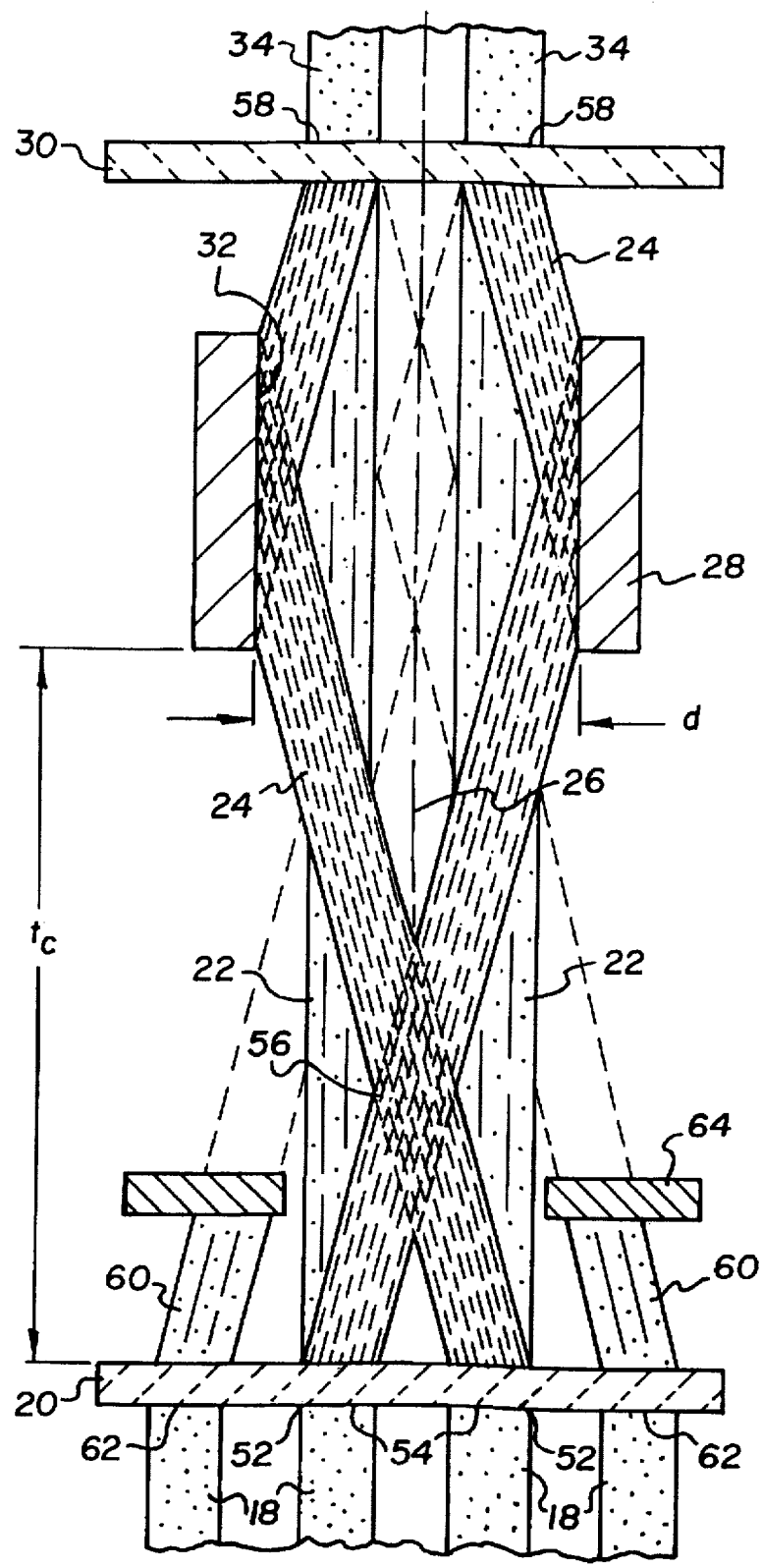
FIG. 2 is an enlarged diagram showing the manipulation of test and reference beams by a pair of diffractive optics for measuring an internal test surface.

The beam management function of the leading and following diffractive optics 20 and 30 is more clearly illustrated in the enlarged view of FIG. 2. The collimated primary beam 18 is divided by overlapping areas 52 and 54 of the leading diffractive optic 20 into the reference beam 22 and the test beam 24. The reference beam 22, which is diffracted at a zero order, emanates from the leading diffractive optic as a collimated beam. The test beam 24, which is diffracted at a non-zero order, emanates from the leading diffractive optic as a converging beam.

According to this embodiment of our invention, the leading diffractive optic 20 is positioned with respect to the internal test surface 32 so that the test beam 24 converges through a focus 56 along a pathway between the leading diffractive optic 20 and the internal test surface 32. The test beam 24 approaches the internal test surface as a diverging beam, but reflection from the test surface 32 reshapes the test beam 24 into a converging beam incident to the following diffractive optic 30. The reference beam 22 propagates to the following diffractive optic 30 in columnar form along a pathway that is independent of the test surface 32.

The collimated reference beam 22 and the converging test beam 24 are combined by respective diffractions through a common area 58 of the following diffractive optic. The reference beam 22 is diffracted without change at a zero diffraction order, and the test beam 24 is diffracted through a non-zero diffraction order into alignment with the reference beam 22. The resulting combined beam 34 is collimated.

For reference purposes, positive diffraction orders are understood to bend light toward the reference axis 26 and negative diffraction orders are understood to bend light away from the reference axis 26. The magnitudes of the diffraction angles increase with higher diffraction orders. For example, collimated light is diffracted into a converging beam through a positive diffraction order and is diffracted into a diverging beam through a negative diffraction order. Conversely, a converging beam is diffracted into a collimated beam through a negative diffraction order, and a diverging beam is diffracted into a collimated beam through a positive diffraction order.

Preferably, the leading diffractive optic 20 is positioned beyond a minimum distance "$t_c$" to the internal test surface 32 along the reference axis 26, which can be calculated as follows:

$$t_c = \frac{2 \tan\mu}{d}$$

where "d" is the diameter of the closest end of the internal test surface 32. Some additional distance is needed to accurately shape the test beam 24. There is no theoretical maximum distance, but excessive distance unnecessarily increases the size of the leading diffractive optic 20.

Collimated light diffracted by the leading diffractive optic 20 through negative diffraction orders diverges through the additional distance to the internal test surface 32. Such negative orders of equal or higher magnitude than the positive diffraction order of the test beam 24 scatter light beyond the diameter "d" of the test surface 32. However, as shown in FIG. 2, an extraneous beam 60 of light from the same sign (i.e., positive) diffraction order can still reach the common area 58 of the following diffractive optic 30 by diffracting through an adjacent area 62 of the leading diffractive optic 20. Without blazing, both the test beam 24 and the extraneous beam 60 are combinable with the reference beam 22 through opposite sign diffraction orders of the following diffractive optic 30.

Accordingly, this embodiment of our invention also includes an aperture stop 64 located adjacent to the leading diffractive optic 20 for blocking the extraneous beam 60. The aperture stop 64, which can be located on either side of the leading diffractive optic 20, is sized large enough in relation to the overlapping areas 52 and 54 of the leading diffractive optic 20 for transmitting both the reference and test beams 22 and 24 to the common area 58 of the following diffractive optic 30 but is sized small enough in relation to the adjacent area 62 of the leading diffractive optic 20 for blocking transmission of the extraneous beam 60 to the common area 58 of the following diffractive optic 30.

The first diffraction order is preferably used for diffracting the test beam 24 from the leading diffractive optic 20. Opposite sign orders of the same or greater magnitude produce extraneous beams that diverge at equal or higher rates, positioning them beyond the internal test surface 32. The same sign orders of the same or greater magnitude produce extraneous beams that reach the common area 58 of the following diffractive optic 30 from separate areas of the leading diffractive optic 20. Accordingly, extraneous light diffracted by the opposite sign orders of the leading diffractive optic 20 is scattered by the crossover, and extraneous light diffracted by the same sign orders is isolated from the test beam 22 and is blocked by the aperture stop 64.

Figure 3:
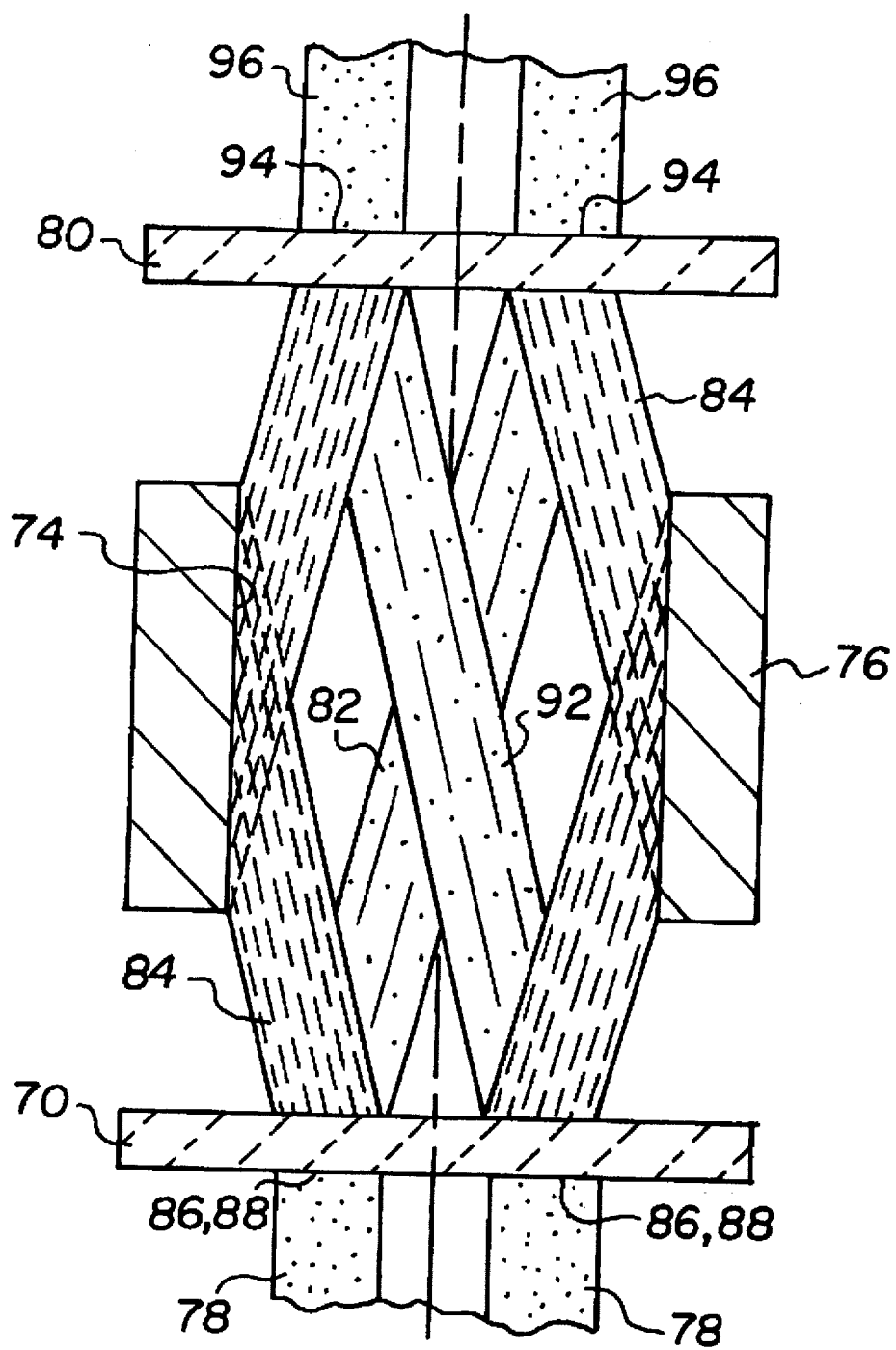
FIG. 3 is a similarly enlarged diagram showing an alternative configuration of the diffractive optics for measuring internal surfaces.

Another embodiment of our invention illustrated by FIG. 3 also includes leading and following diffractive optics 70 and 80 for measuring an internal test surface 74 of a test piece 76. A collimated primary beam 78 is diffracted by opposite sign orders of the leading diffractive optic 70 into a converging reference beam 82 and a diverging test beam 84. The reference and test beams 82 and 84 preferably emanate from overlapping areas 86 and 88 of the leading diffractive optic 70. However, leading diffractive optic 70 and the internal test surface 74 can be adjusted through a range of distances at which the areas 86 and 88 are separated.

The reference beam 82 is conveyed along a path independently of the internal test surface 74 through a focus 92 to a common area 94 of the following diffractive optic 80. The test beam 84 is reflected from the internal test surface 74 along a path to the common area 94 of the following diffractive optic 80. The reference beam 82 approaches the common area 94 as a diverging beam, and the test beam 84 approaches the common area 94 as a converging beam. The following diffractive optic 80 diffracts the reference and test beams 82 and 84 through opposite sign diffraction orders into alignment with each other as a collimated combined beam 96.

Transmissions of collimated light through the following diffractive optic 80, which could interfere with the collimated combined beam 96, are blocked by suppressing zero diffraction orders through one or both of the diffractive optics 70 and 80. Preferably, zero-order diffractions through both diffractive optics 70 and 80 are suppressed to provide more complete suppression of the extraneous collimated light and to concentrate more of the light into the desired non-zero diffraction orders. For measuring cylindrical test surfaces, the leading and diffractive optics are preferably interchangeable.

Figure 4:
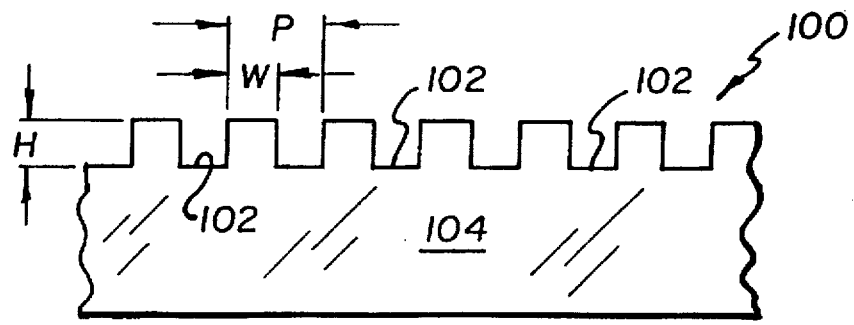
FIG. 4 is a cross-sectional view through a diffractive optic showing relationships for suppressing zero-order diffraction.

FIG. 4 shows a cross section of a binary phase grating 100 that can be used as one of the diffractive optics 70 or 80. A series of rectangular-shaped grooves 102 are formed in an optical medium 104 at a density that determines the amount of bending provided by each diffraction order. Higher densities equate to more bending, and lower densities equate to less bending. The grooves 102 are preferably sized in width "W" with respect to their periodic spacing "P" to exhibit a 50 percent duty cycle "$D_c$" as related by the following equation:

$$D_c = \frac{W}{P}$$

The grooves 102 are also preferably sized in height "H" according to the following equation:

$$H = \frac{\lambda}{2(n-1)}$$

where "$\lambda$" is the wavelength of the light conveyed through the binary phase grating 100 and "n" is the index of refraction of the optical medium 104. The specified duty cycle "$D_c$" divides light energies equally between a first portion transmitted through the grooves 102 and a second portion transmitted through the optical medium 104, and the height "H" of the grooves 102 produces a relative phase shift between the first and second portions by an amount that suppresses transmissions of light at the wavelength "$\lambda$" through the mechanism of destructive interference. Many other configurations of diffractive optics can also be used, which rely on similar principles to suppress zero-order transmissions; and these configurations are already well known to those of skill in this art.

Figure 5:
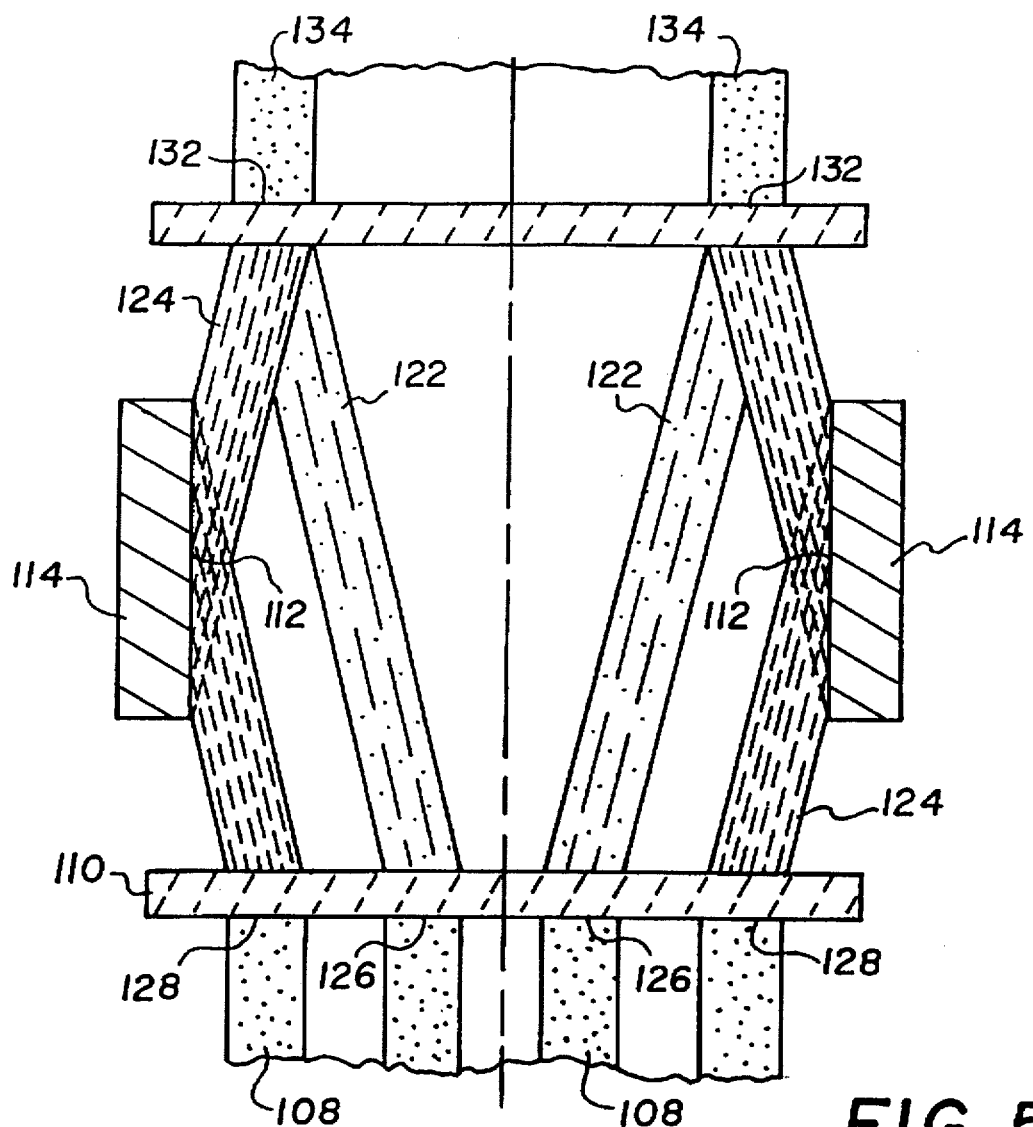
FIG. 5 is a similar diagram showing another alternative configuration of the diffractive optics for measuring internal surfaces.

Another embodiment for measuring internal test surfaces with suppressed zero-order diffractions is illustrated by FIG. 5. A leading diffractive optic 110 diffracts a collimated primary beam 108 into reference and test beams 122 and 124 through the same sign diffraction orders (preferably the same first order). The reference and test beams 122 and 124 emanate from different areas 126 and 128 of the leading diffractive optic on diverging paths. The reference beam continues on a path of divergence to a common area 132 of a following diffractive optic 120. The test beam 124 is reflected by an internal test surface 112 of a test piece 114 on a converging path to the common area 132 of the following diffractive optic.

The diverging reference beam 122 and the converging test beam 124 are diffracted by the following diffractive optic 120 through opposite sign diffraction orders into a combined collimated beam 134. One but preferably both of the leading and following diffractive optics 110 or 120 are arranged for suppressing zero-order diffraction. Accordingly, collimated light from the primary beam 108 that is not diffracted into a positive or negative diffraction order is blocked from joining the combined collimated beam 134.

Figure 6:
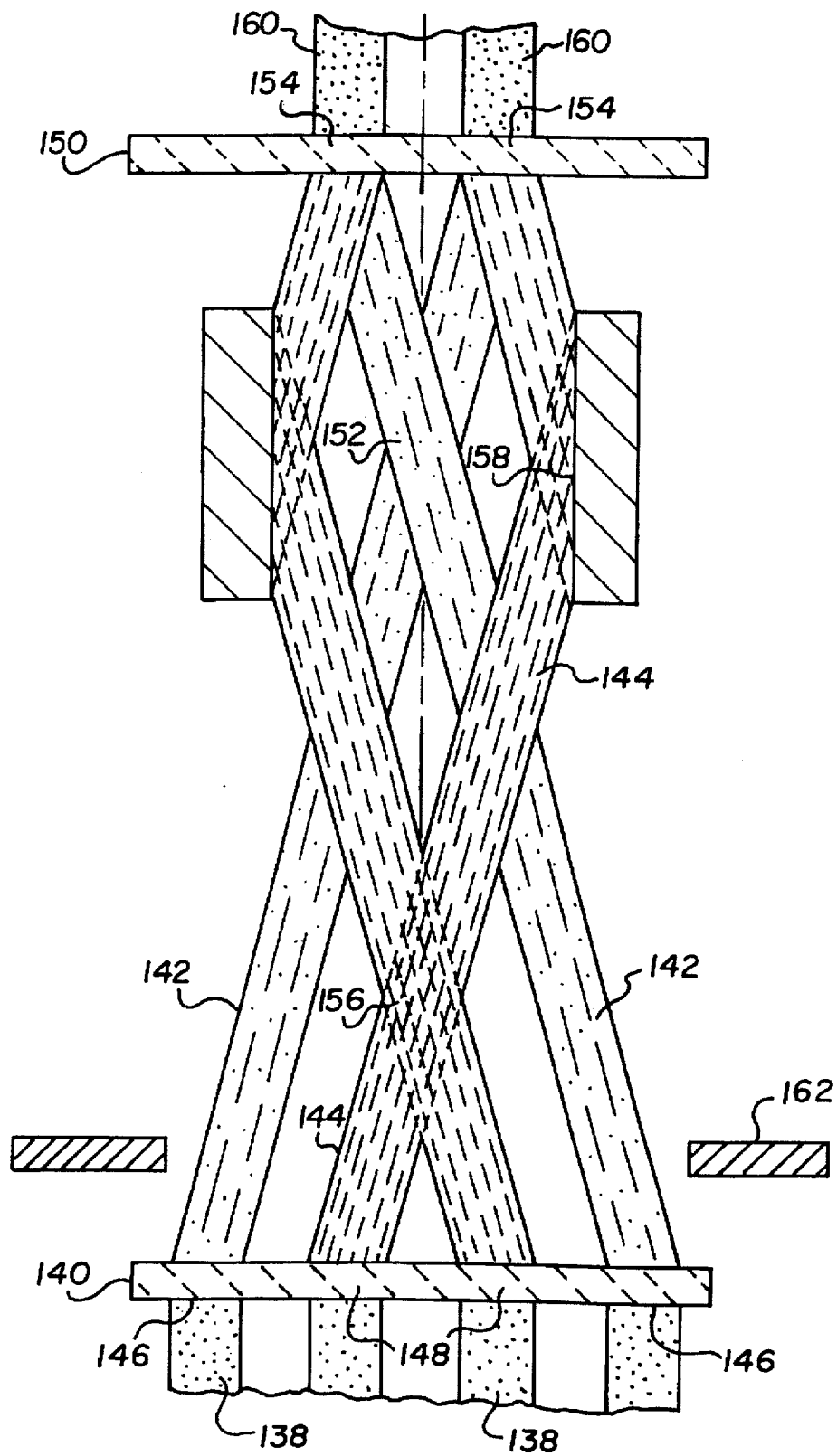
FIG. 6 is a similar diagram showing an alternative configuration that combines elements from the configurations of the other figures for measuring internal surfaces.

A further embodiment, which combines features from the preceding embodiments, uses both crossover and zero-order suppression for measuring internal test surfaces. According to FIG. 6, a leading diffractive optic 140 divides a collimated primary beam 138 into respective converging reference and test beams 142 and 144. The two beams 142 and 144 emanate from separate areas 146 and 148 of the leading diffractive optic.

The reference beam 142 propagates through a focus 152 before approaching a common area 154 of a following diffractive optic 150 as a diverging beam. The test beam 144 propagates through a focus 156 before approaching an internal test surface 158 also as a diverging beam. However, after reflecting from the internal test surface 158 at a grazing angle, the test beam approaches the common area 154 of the following diffractive optic 150 as a converging beam. The following diffractive optic diffracts the diverging reference beam 142 and the converging test beam 144 through opposite sign diffraction orders into a collimated combined beam 160.

One or both diffractive optics 140 or 150 are arranged to suppress zero-order transmissions of light. The crossover of the test beam 144 in advance of the test surface 158 scatters negative-order transmissions (i.e., extraneous diverging beams) from the leading diffractive optic 140. Finally, an aperture stop 162 can be used to block unwanted higher positive-order transmissions (i.e., extraneous converging beams) through the leading diffractive optic 140.

Figure 7:
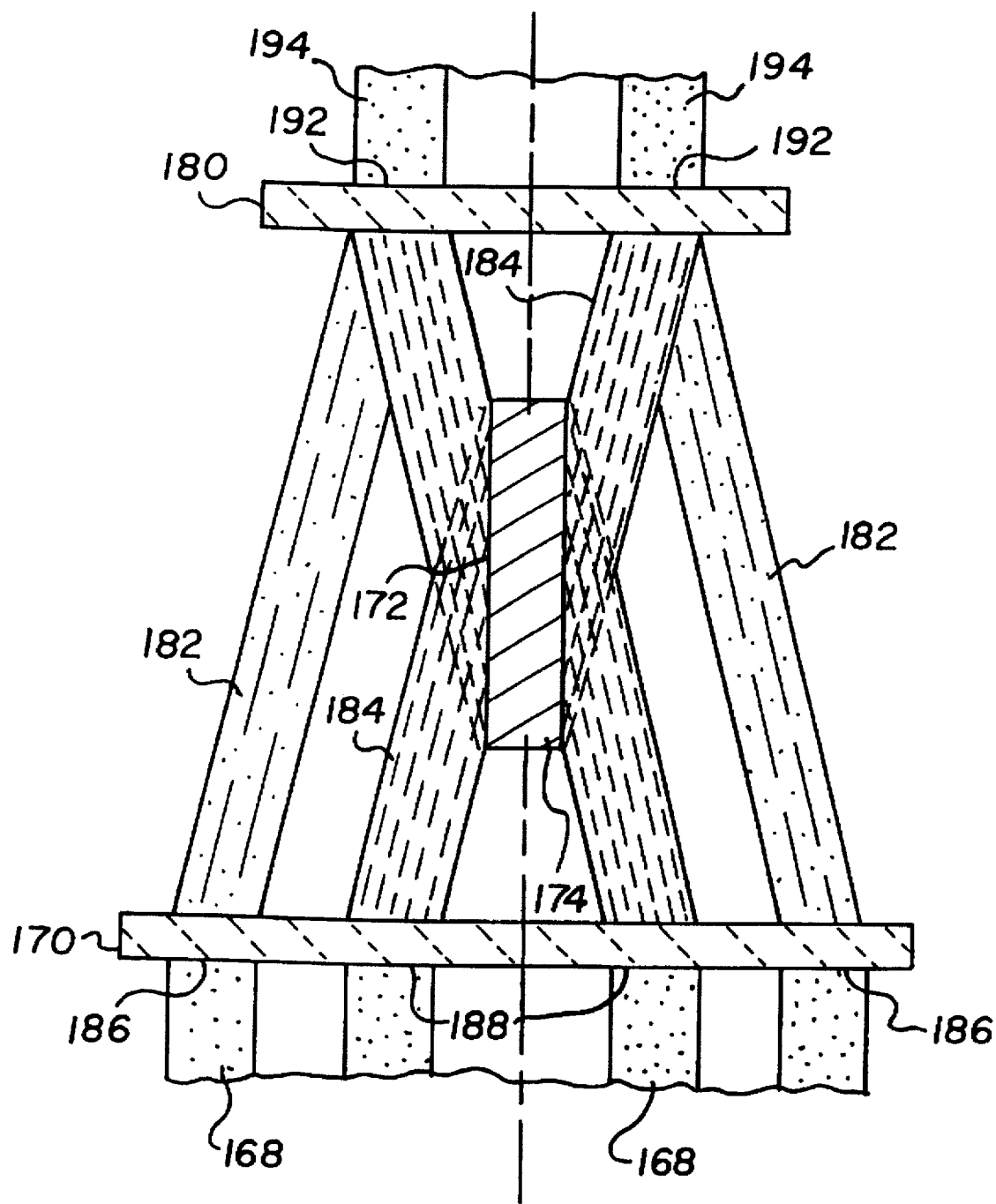
FIG. 7 is a similar diagram showing an alternative configuration of the diffractive optics for measuring external surfaces.

Outside test surfaces can be measured similarly. For example, FIG. 7 shows leading and following diffractive optics 170 and 180 shaping reference and test beams 182 and 184 with non-zero diffraction orders for measuring an external cylindrical surface 172 of a test piece 174. Both the reference beam 182 and the test beam 184 emanate as converging beams from separate areas 186 and 188 of the leading diffractive optic 170. The reference beam 182 converges directly to a common area 192 of the following diffractive optic 120. The test beam 184 approaches the common area 192 of the following diffractive optic 180 as a diverging beam after reflecting from the external surface 172.

The following diffractive optic 180 diffracts the reference and test beams 182 and 184 through opposite sign orders into a collimated combined beam 194. At least one of the leading and following diffractive optics 170 and 180 is arranged to block transmissions of light at the zero diffraction order. Accordingly, undiffracted collimated light from a primary beam 168 is blocked from interfering with the collimated combined beam 194 that contains information representing variations in the test surface 172.

Many other variations and combinations of the embodiments are also possible. For example, aperturing can be used in any of these embodiments to block unwanted transmissions through the leading diffractive optics. Other and more complex shapes of test surfaces can also be measured by appropriately varying groove patterns of the diffractive optics. Further details regarding the design of such diffractive optics are found in copending U.S. application Ser. Nos. 08/483,737, filed Jun. 7, 1995, and 08/509,161, filed Jul. 31, 1995. Both applications are hereby incorporated by reference.

We claim:

1. An interferometer for measuring internal test surfaces at grazing incidence comprising:
   a leading diffractive optic that divides a primary beam of light into a test beam and a reference beam;
   a following diffractive optic that recombines the test and reference beams;
   a first pathway that conveys the test beam between said leading and following diffractive optics at grazing incidence to an internal test surface;
   a second pathway that conveys the reference beam between said leading and following diffractive optics independently of the internal test surface;
   said leading diffractive optic being positioned so that the test beam emanates from said leading diffractive optic as a converging beam but approaches the internal test surface as a diverging beam;
   said following diffractive optic being positioned so that the reflected test beam approaches said following diffractive optic as a converging beam; and
   an aperture stop located in advance of the internal test surface and sized for blocking an extraneous portion of the primary beam from combining with the test and reference beams at the following diffractive optic.

2. The interferometer of claim 1 in which said leading diffractive optic is arranged for diffracting the extraneous portion of the primary beam as a converging beam.

3. The interferometer of claim 2 in which said leading diffractive optic is positioned with respect to the internal test surface so that the test beam and the extraneous portion of the primary beam are diffracted by different areas of the leading diffractive optic.

4. The interferometer of claim 3 in which said aperture stop blocks said area through which the extraneous portion of the primary beam is diffracted.

5. The interferometer of claim 1 in which the test and reference beams are recombined within a common area of said following diffractive optic.

6. The interferometer of claim 5 in which said following diffractive optic is arranged for diffracting both the test beam and the extraneous portion of the primary beam into alignment with the reference beam.

7. The interferometer of claim 6 in which said following diffractive optic diffracts the test beam and the extraneous portion of the primary beam from opposite sign diffraction orders.

8. The interferometer of claim 7 in which said leading diffractive optic diffracts the test beam and the extraneous portion of the primary beam at the same sign diffraction orders.

9. The interferometer of claim 8 in which said aperture stop is located adjacent to said leading diffractive optic.

10. An interferometer for measuring internal test surfaces at grazing incidence comprising:
    a leading diffractive optic having a first area for diffracting a test beam out of alignment with a reference beam and a second area for diffracting an extraneous beam into alignment with the test beam;
    a following diffractive optic having a common area for diffracting the test beam, reference beam, and extraneous beam into alignment with each other;
    a first pathway for conveying the test beam to said common area of the following diffractive optic at grazing incidence to an internal test surface;
    a second pathway for conveying the reference beam to said common area of the following diffractive optic independently of the internal test surface;
    said leading diffractive optic being positioned with respect to the internal test surface so that said first and second areas are separate from each other;
    said following diffractive optic being positioned closer to the internal test surface than said leading diffractive optic; and
    an aperture stop positioned in advance of the internal test surface and sized in relation to said first and second areas of said leading diffractive optic for transmitting the test and reference beams to said common area of the following diffractive optic and for blocking the extraneous beam from reaching said common area of the following diffractive optic.

11. The interferometer of claim 10 in which said leading diffractive optic is arranged for diffracting the test and extraneous beams into alignment through the same diffraction order.

12. The interferometer of claim 11 in which said following diffractive optic is arranged for diffracting the test and extraneous beams into alignment through opposite sign diffraction orders.

13. The interferometer of claim 12 in which said leading and following diffractive optics diffract the reference beam without change through a zero diffraction order.

14. The interferometer of claim 12 in which said opposite sign diffraction orders of the following diffractive optic are equal in magnitude.

15. The interferometer of claim 14 in which said same diffraction order of the leading diffractive optic and said opposite sign diffraction orders of the following diffractive optic are all equal in magnitude.

16. The interferometer of claim 10 in which said leading diffractive optic is positioned with respect to the internal test surface so that the test beam converges through a focus along said first pathway between said leading diffractive optic and the internal test surface.

17. The interferometer of claim 16 in which said aperture stop is located adjacent to said leading diffractive optic.

18. The interferometer of claim 16 in which said leading diffractive optic is spaced from the internal test surface through a minimum distance "$t_c$" that can be calculated as follows:

$$t_c = \frac{2 \tan\mu}{d}$$

where "d" is a diameter of the internal test surface and "$\mu$" is a diffraction angle through which the test beam is bent by said leading diffractive optic.

19. An interferometer for measuring test surfaces at grazing incidence comprising:

a leading diffractive optic that diffracts a primary beam of light into a test beam and a reference beam;

a following diffractive optic that diffracts the test and reference beams into alignment with each other;

a first pathway that conveys the test beam between said leading and following diffractive optics at grazing incidence to a test surface;

a second pathway that conveys the reference beam between said leading and following diffractive optics independently of the test surface;

said leading diffractive optic diffracting the primary beam into the test and reference beams through respective non-zero diffraction orders;

said following diffractive optic diffracting the test and reference beams into alignment with each other through respective non-zero diffraction orders; and at least one of said leading and following diffractive optics arranged for suppressing transmissions of light at a zero diffraction order.

20. The interferometer of claim 19 in which said non-zero diffraction orders of the leading diffractive optic are opposite sign orders.

21. The interferometer of claim 20 in which the test and reference beams are diffracted at said opposite sign orders through overlapping areas of said leading diffractive optic.

22. The interferometer of claim 20 in which the test beam emanates from said leading diffractive optic as a diverging beam, and the reference beam emanates from said leading diffractive optic as a converging beam.

23. The interferometer of claim 22 in which the test beam, after reflection from the test surface, approaches said following diffractive optic as a converging beam; and the reference beam, after converging through a focus, approaches a common area of said following diffractive optic as a diverging beam.

24. The interferometer of claim 23 in which said following diffractive optic diffracts the test and reference beams into alignment with each other through opposite sign diffraction orders.

25. The interferometer of claim 24 in which the primary beam is a beam of collimated light, and the combined test and reference beams emanate from said following diffractive optic as a collimated beam.

26. The interferometer of claim 25 in which one of said leading and following diffractive optics is arranged for suppressing transmission of collimated light from the primary beam.

27. The interferometer of claim 19 in which said non-zero diffraction orders of the leading diffractive optic are the same sign orders.

28. The interferometer of claim 27 in which said non-zero diffraction orders of the leading diffractive optic are equal in magnitude.

29. The interferometer of claim 27 in which the test and reference beams are diffracted at said same sign orders through different areas of said leading diffractive optic.

30. The interferometer of claim 29 in which both the test beam and the reference beam emanate from said leading diffractive optic as diverging beams.

31. The interferometer of claim 29 in which both the test beam and the reference beam emanate from said leading diffractive optic as converging beams.

32. The interferometer of claim 31 in which the test beam, after reflection from the test surface, approaches said following diffractive optic as a diverging beam; and the reference beam approaches a common area of the following diffractive optic as a converging beam.

33. The interferometer of claim 31 in which said leading diffractive optic is positioned with respect to the test surface so that the test beam converges through a focus along said first pathway between said leading diffractive optic and the test surface.

34. The interferometer of claim 33 in which the test beam, after reflection from the test surface, approaches said following diffractive optic as a converging beam; and the reference beam, after converging through a focus along said second pathway, approaches a common area of said following diffractive optic as a diverging beam.

35. The interferometer of claim 29 in which said following diffractive optic diffracts the test and reference beams into alignment with each other through opposite sign diffraction orders.

36. The interferometer of claim 35 in which the primary beam is a beam of collimated light, and the combined test and reference beams emanate from said following diffractive optic as a collimated beam.

37. The interferometer of claim 36 in which at least one of said leading and following diffractive optics is arranged for suppressing transmission of collimated light from the primary beam.

38. The interferometer of claim 31 further comprising an aperture stop located adjacent to said leading diffractive optic and sized for allowing transmission light along said first and second pathways through said different areas of the leading diffractive optic and for blocking light from transmitting to said common area of the following diffractive optic through another area of said leading diffractive optic.

39. The interferometer of claim 19 in which both of said leading and following diffractive optics are arranged for suppressing transmissions of light at a zero diffraction order.

40. The interferometer of claim 39 in which said non-zero diffraction orders of the leading diffractive optic and said non-zero diffraction orders of the following diffractive optic are all equal in magnitude.

41. The interferometer of claim 19 in which at least one of said leading and following diffractive optics is a diffraction grating having a groove height selected for suppressing zero-order diffraction.

42. The interferometer of claim 41 in which said diffraction grating is a binary phase grating having a duty cycle of approximately 50 percent.

43. The interferometer of claim 42 in which said groove height "H" is determined according to the following relationship:

$$H = \frac{\lambda}{2(n-1)}$$

where "λ" is the wavelength of the primary beam and "n" is the refractive index of the grating.

44. A method of measuring internal test surfaces at grazing incidence comprising the steps of:
   dividing a primary beam of light into a test beam and a reference beam at a leading diffractive optic;
   recombining the test and reference beams at a following diffractive optic;
   conveying the test beam along a first pathway between the leading and following diffractive optics at grazing incidence to an internal test surface;
   conveying the reference beam along a second pathway between the leading and following diffractive optics independently of the internal test surface;
   positioning the leading diffractive optic so that the test beam emanates from the leading diffractive optic as a converging beam but approaches the internal test surface as a diverging beam;
   positioning the following diffractive optic so that the reflected test beam approaches the following diffractive optic as a converging beam; and
   blocking an extraneous portion of the primary beam from combining with the test and reference beams at the following diffractive optic.

45. The method of claim 44 including the further step of diffracting the extraneous portion of the primary beam as a converging beam from the leading diffractive optic.

46. The method of claim 45 in which said step of positioning the leading diffractive optic includes positioning the leading diffractive optic with respect to the internal test surface so that the test beam and the extraneous portion of the primary beam are diffracted by different areas of the leading diffractive optic.

47. The method of claim 46 in which said step of blocking an extraneous portion of the primary beam includes sizing an aperture stop to block the area through which the extraneous portion of the primary beam is diffracted.

48. The method of claim 44 in which the test and reference beams are recombined within a common area of the following diffractive optic.

49. The method of claim 48 including the further step of arranging the following diffractive optic for diffracting the test beam and the extraneous portion of the primary beam into alignment with the reference beam through opposite sign diffraction orders.

50. The method of claim 49 including the further step of arranging the leading diffractive optic for diffracting the test beam and the extraneous portion of the primary beam at the same sign diffraction orders.

51. The method of claim 47 including the further step of locating the aperture stop adjacent to the leading diffractive optic.

52. A method of measuring internal test surfaces at grazing incidence comprising:
   diffracting a test beam out of alignment with a reference beam through a first area of a leading diffractive optic;
   arranging the leading diffractive optic for diffracting an extraneous beam into alignment with the test beam through a second area of the leading diffractive optic;
   diffracting the test beam and the reference beam into alignment with each other through a common area of a following diffractive optic;
   arranging the following diffractive optic for diffracting the extraneous beam into alignment with the test and reference beams through the common area of the following diffractive optic;
   conveying the test beam along a first pathway to the common area of the following diffractive optic at grazing incidence to an internal test surface;
   conveying the reference beam along a second pathway to the common area of the following diffractive optic independently of the internal test surface;
   positioning the leading diffractive optic with respect to the internal test surface so that the first and second areas of the leading diffractive optic are separate from each other;
   positioning the following diffractive optic closer to the internal test surface than the leading diffractive optic;
   locating an aperture stop adjacent to the leading diffractive optic; and
   sizing the aperture stop in relation to the first and second areas of the leading diffractive optic for transmitting the test and reference beams to the common area of the following diffractive optic and for blocking the extraneous beam from reaching the common area of the following diffractive optic.

53. The method of claim 52 including the step of arranging the leading diffractive optic for diffracting the test and extraneous beams into alignment through the same diffraction order.

54. The method of claim 53 including the step of arranging the following diffractive optic for diffracting the test and extraneous beams into alignment through opposite sign diffraction orders.

55. The method of claim 54 in which said steps of diffracting include diffracting the reference beam through both the leading and following diffractive optics at a zero diffraction order.

56. The method of claim 52 in which said step of positioning the leading diffractive optic includes positioning the leading diffractive optic with respect to the internal test surface so that the test beam converges through a focus along the first pathway between the leading diffractive optic and the internal test surface.

57. A method of measuring test surfaces at grazing incidence comprising:
   diffracting a primary beam of light into a test beam and a reference beam at respective non-zero diffraction orders of a leading diffractive optic;
   diffracting the test and reference beams into alignment with each other at respective non-zero diffraction orders of a following diffractive optic;
   conveying the test beam along a first pathway between the leading and following diffractive optics at grazing incidence to a test surface;
   conveying the reference beam along a second pathway between the leading and following diffractive optics independently of the test surface; and
   suppressing transmissions of light at a zero diffraction order of at least one of the leading and following diffractive optics.

58. The method of claim 57 in which the non-zero diffraction orders of the leading diffractive optic are opposite sign orders.

59. The method of claim 58 in which the test and reference beams are diffracted at the opposite sign orders through overlapping areas of the leading diffractive optic.

60. The method of claim 58 in which:

(a) the test beam emanates from the leading diffractive optic as a diverging beam and the reference beam emanates from the leading diffractive optic as a converging beam;

(b) the test beam, after reflection from the test surface, approaches the following diffractive optic as a converging beam;

(c) the reference beam, after converging through a focus, approaches a common area of the following diffractive optic as a diverging beam; and (d) the following diffractive optic diffracts the test and reference beams into alignment with each other through opposite sign diffraction orders.

61. The method of claim 60 in which:

(a) the primary beam is a beam of collimated light;

(b) the combined test and reference beams emanate from the following diffractive optic as collimated light; and (c) one of the leading and following diffractive optics is arranged for suppressing transmission of the collimated light from the primary beam.

62. The method of claim 57 in which the non-zero diffraction orders of the leading diffractive optic are the same sign orders.

63. The method of claim 62 in which the non-zero diffraction orders of the leading diffractive optic are equal in magnitude.

64. The method of claim 62 in which the test and reference beams are diffracted at the same sign orders through different areas of the leading diffractive optic.

65. The method of claim 64 in which both the test beam and the reference beam emanate from the leading diffractive optic as converging beams.

66. The method of claim 65 in which:

(a) the leading diffractive optic is positioned with respect to the test surface so that the test beam converges through a focus along the first pathway between the leading diffractive optic and the test surface;

(b) the test beam, after reflection from the test surface, approaches the following diffractive optic as a converging beam; and (c) the reference beam, after converging through a focus along the second pathway, approaches a common area of the following diffractive optic as a diverging beam.

67. The method of claim 65 in which the test beam, after reflection from the test surface, approaches the following diffractive optic as a diverging beam; and the reference beam approaches a common area of the following diffractive optic as a converging beam.

68. The method of claim 64 in which both the test beam and the reference beam emanate from the leading diffractive optic as diverging beams.

69. The method of claim 68 in which the test beam, after reflection from the test surface, approaches the following diffractive optic as a converging beam; and the reference beam approaches a common area of the following diffractive optic as a diverging beam.

70. The method of claim 64 in which the following diffractive optic diffracts the test and reference beams into alignment with each other through opposite sign diffraction orders.

71. The method of claim 70 in which:

(a) the primary beam is a beam of collimated light;

(b) the combined test and reference beams emanate from the following diffractive optic as collimated light; and (c) at least one of the leading and following diffractive optics is arranged for suppressing transmission of the collimated light from the primary beam.

72. The method of claim 57 in which both of the leading and the following diffractive optics are arranged for suppressing transmissions of light at a zero diffraction order.

73. The method of claim 72 in which the non-zero orders of the leading and the following diffractive optics are equal in magnitude.

* * * * *